United States Patent [19]
Calkins

[11] 4,359,972
[45] Nov. 23, 1982

[54] THERMOSTATICALLY CONTROLLED VALVE

[76] Inventor: Noel C. Calkins, 353 Bryce Ave., Los Alamos, N. Mex. 87544

[21] Appl. No.: 273,683

[22] Filed: Jun. 15, 1981

[51] Int. Cl.³ .............................................. F01P 7/16
[52] U.S. Cl. ................................ 123/41.08; 123/557; 236/34.5; 236/101 C
[58] Field of Search ................ 123/41.08, 41.09, 41.1, 123/557; 236/34, 34.5, 43, 101 R, 101 A, 101 B, 101 D

[56] References Cited

U.S. PATENT DOCUMENTS

| | | | |
|---|---|---|---|
| 1,219,515 | 3/1917 | Whittelsey | 236/19 |
| 2,033,575 | 3/1936 | Hochreiter et al. | 123/557 |
| 2,748,758 | 6/1956 | Fairbanks | 123/557 |
| 2,788,176 | 4/1957 | Andersen | 236/34.5 |
| 2,788,779 | 4/1957 | Mengelkamp et al. | 123/552 |
| 2,988,280 | 6/1961 | Kimm et al. | 236/34.5 |
| 3,378,063 | 4/1968 | Mefferd | 165/40 |
| 3,472,214 | 10/1969 | Moon | 123/557 |
| 3,768,731 | 10/1973 | Lavado | 236/101 B |
| 4,072,138 | 2/1978 | Hawkins et al. | 123/552 |

*Primary Examiner*—William A. Cuchlinski, Jr.
*Attorney, Agent, or Firm*—Edward C. Walterscheid

[57] ABSTRACT

The thermostatically controlled valve is of a type wherein the flow of fluid is increased when the temperature of the fluid is in a low to medium range and decreased as the temperature of the fluid exceeds a desired range. In a preferred embodiment, it makes use of a poppet valve assembly. It is particularly useful to control the temperature at which vaporization occurs in a liquid propane vaporizer utilized in the fuel system of an internal combustion engine.

12 Claims, 7 Drawing Figures

U.S. Patent   Nov. 23, 1982   Sheet 1 of 3   4,359,972
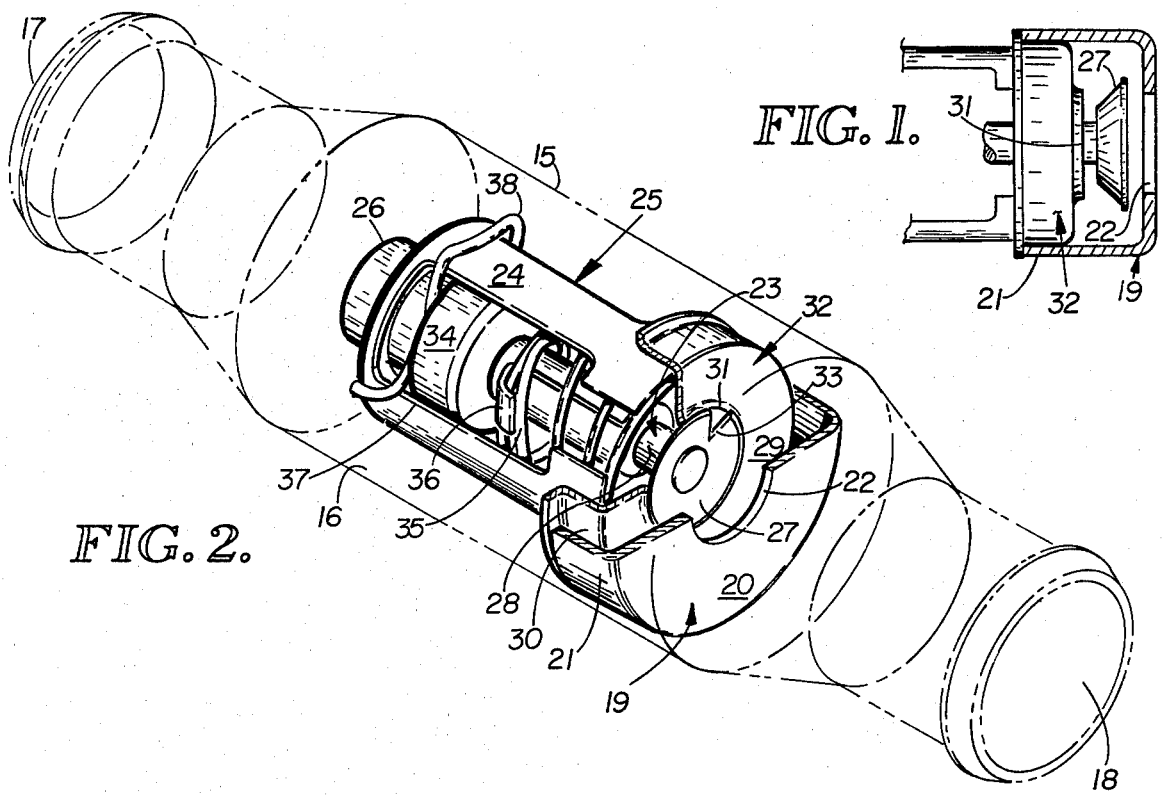
FIG. 1.
FIG. 2.
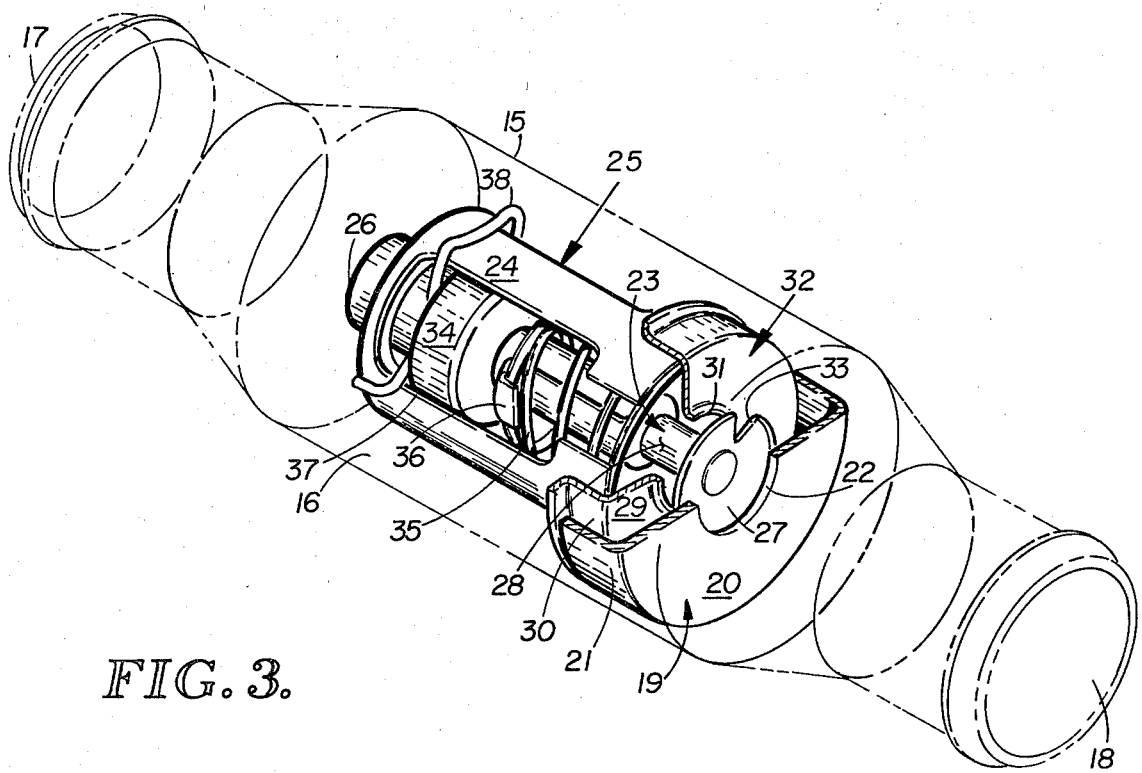
FIG. 3.

THERMOSTATICALLY CONTROLLED VALVE

BACKGROUND OF THE INVENTION

The invention described herein relates generally to fluid flow controlling devices and more particularly to automatically operated valve mechanisms used with heat exchangers to govern the flow of fluid through the various passages thereof.

Internal combustion engines powered by a combustible petroleum gas are widely used. While such engines typically use gasoline as a fuel, it is well known that they may readily be converted to use petroleum fuels which are not liquids at or near room temperature and pressure. Examples of such fuels are LPG (liquefied petroleum gas) which comprises a mixture of hydrocarbons which are gases or vapors at engine inlet pressures and temperatures, methane, ethane, propane, butane, as well as mixtures thereof. Such fuels are liquefied and stored under high pressure prior to use.

Although they provide somewhat less energy than gasoline, such liquefied gases are also less expensive than gasoline. Indeed, the spread in price between the two types of fuel has recently made the use of certain liquefied gases, and in particular, propane, quite attractive.

The conversion of a liquefied gas, such as liquefied propane, to a vapor by expansion for purposes of carburetion in an internal combustion engine results in a significant refrigerant action which would quickly cause the system to ice up and freeze if heat were not added. The art teaches that this problem may be controlled by converting the liquid propane to its vapor in a heat exchanger wherein the necessary heat is supplied by the heated coolant liquid used to cool the engine. Unfortunately, the amount of heat supplied to the exchanger by constant circulation of the coolant liquid through the exchanger is highly variable and depends on a wide variety of factors such as engine thermostat, engine and water pump r.p.m., ambient temperature, ventilation, emission controls, and time required to reach the desired coolant operating temperature for the engine.

Any substantial variation in the amount of heat supplied to the heat exchanger for vaporizing the liquid propane can result in a significant change in the expansion rate of the propane as it vaporizes. This in turn can result in large variations in the fuel/air ratio in the carburetor and a fuel/air mixture that may be either too lean or too rich for the particular operating conditions.

Moreover, in recent years governmental (EPA) regulations have required engine coolants in the coolant jacket to be at temperatures as high as 212° F. to reduce engine exhaust emissions. Unfortunately, however, when propane vapor is heated in excess of about 140° F. it begins to "crack" and forms a liquid oily residue which adversely affects the elastomeric components and seals in the system.

It will thus be seen that it is highly advantageous to have some means of closely controlling or regulating the flow of engine coolant through the heat exchanger to thereby control the amount of heat which is added to the propane. In U.S. Pat. No. 3,378,063 issued Apr. 16, 1968, R. L. Mefferd teaches a thermostat control valve designed to control such flow. Unfortunately, the valve taught by Mefferd is expensive to manufacture and is not self cleaning. It requires the use of a cage valve as opposed to the simpler poppet valve.

Accordingly, an object of the present invention is to provide a novel thermostatically controlled valve for regulating a flow of heated fluid, e.g., engine coolant.

Another object of the invention is to provide a more economic thermostatically controlled valve for regulating the vaporization of liquefied petroleum gases such as, for example, propane.

Yet another object of the invention is to provide a thermostatically controlled valve for regulating the vaporization of liquefied petroleum gases which is self cleaning.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The invention is directed to a thermostatically controlled valve in which the flow of fluid is increased when the temperature of the fluid is in a low to medium range and decreased as the temperature of the fluid exceeds a desired range. To achieve the foregoing and other objects and in accordance with the purpose of the present invention, the apparatus of this invention may, in its broad aspect, comprise the following combination.

An elongated body is provided which has an internal chamber and an inlet port and an outlet port opening into this chamber. A first valve port means is symmetrically disposed in the chamber normal to the axis between the inlet and outlet ports. A valve means in the chamber is axially movable to and from the valve port means so as to adjust the rate of flow therethrough. A spring is placed in the inlet side of the chamber such that it is axially opposed to the valve means and biases it toward a valve open position. The valve means has a temperature-responsive axial force actuator fixedly connected to it in the inlet side of the chamber. Finally, there is means connected to the first valve port means which holds the end of the actuator which is opposite to the first valve port means in fixed spaced relationship to the first valve port means. The connected means is such that the inlet port and the actuator are in fluid communication with each other.

In a preferred embodiment, the valve means is a poppet valve assembly. There may be a second valve port means with the head of the poppet valve moving axially in the space between the first and second valve port means. If a second valve port means is used, a means is provided for assuring a desired continuous fluid communication from the inlet side of the chamber to the space between the first and second valve port means. In another embodiment, the first valve port means may comprise a funnel shaped member in which the port is axially elongated.

When the temperature of the fluid entering the chamber increases, it causes the actuator to expand against the opposing action of the spring and thereby causes the valve means to move axially toward the first valve port means. This movement when sufficiently pronounced results in a reduction of flow through the first valve port means and hence through the outlet port. When the temperature of the fluid entering the inlet port decreases, the actuator contracts axially and the spring action causes the valve means to move away from the first valve port means, with a resultant increase in flow through the entire valve assembly.

The thermostatically controlled valve of the invention is particularly useful for regulating a flow of heated fluid into heat exchange relationship with a liquefied gas, as for example in a liquid/vapor converter used in conjunction with a propane-fueled internal combustion engine.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 1 is a sectional view through a portion of the embodiment of FIG. 2 showing the valve head in the open position.

FIG. 2 is an isometric partially cutaway view of one embodiment of the thermostatically controlled valve of the invention shown with the valve in an open or neutral position.

FIG. 3 is an isometric partially cutaway view of the embodiment of FIG. 2 with the valve in a closed position.

DETAILED DESCRIPTION OF THE INVENTION

Figure 7:
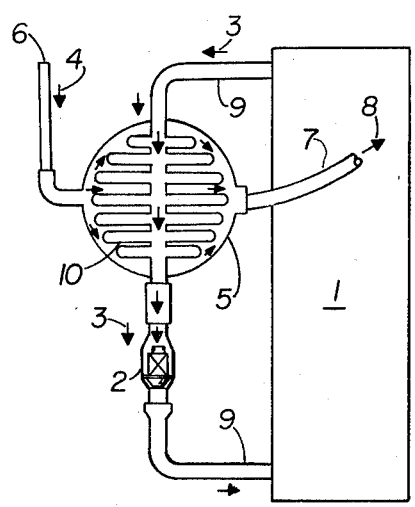
FIG. 7 is a schematic representation of the manner in which the thermostatically controlled valve of the invention may be used with a liquid/vapor converter for a propane-fueled internal combustion engine.

An example of the manner in which the thermostatically controlled valve of the invention may readily be used to regulate vaporization of propane in a propane-fueled internal combustion engine is shown in FIG. 7. Liquid high pressure propane flows 4 through liquid propane inlet 6 into a liquid/vapor converter or vaporizer 5 wherein it is converted by pressure reduction to vapor which flows 8 through line 7 to the engine carburetor where it is mixed with air to provide the engine fuel mixture. A recirculation system 9 is provided from the radiator and coolant jacket of engine 1 whereby engine coolant 3 is flowed through vaporizer 5 to provide waste heat from engine 1 to heat exchanger 10 in vaporizer 5. On exiting from vaporizer 5 the coolant liquid then passes through thermostatically controlled valve 2 which regulates the flow on the basis of the temperature of the liquid coolant as it passed through valve 2.

One embodiment of thermostatically controlled valve 2 is shown in FIGS. 2-3. Elongated body 15 has an internal chamber 16 and an inlet port 17 and outlet port 18. Cartridge 25 is axially disposed within chamber 16 which is divided into two parts by first valve port means 19 at the outlet end of cartridge 25. As shown in FIGS. 2-3, first valve port means 19 consists of washer-shaped member 20 having circumferential collar 21. The aperture in member 20 serves as valve port 22. It will be seen that first valve port means 19 is symmetrically disposed normal to the axis formed between ports 17 and 18. The main body of cartridge 25 is formed by hollow cylinder 24 which is crimped or otherwise reduced in size at its inlet end 26. Second valve port means 32 is mounted at the outlet end of cylinder 24. It consists of washer-shaped member 29 having circumferential collar 30 which mates to the exterior of cylinder 24. Member 20 is held in parallel spaced relationship to member 29 by collar 21 which mates to the exterior of collar 30.

Valve means 23 is partially disposed in cylinder 24. It consists of a poppet valve assembly wherein valve head 27 is mounted on spindle 28. Spindle 28 passes through valve port 31 and permits valve head 27 to move axially in the region or space between members 29 and 20. The diameter of valve head 27 is greater than that of ports 22 and 31. Notch 33 in valve head 27 permits a slight flow of fluid and pressure bleed through the valve assembly even when the valve is in the fully closed position, i.e., when valve head 27 is flush against member 20. This assures that the thermostatically controlled valve will be exposed to temperature conditions as they actually exist upstream thereof, i.e., in vaporizer 5 in the system shown in FIG. 7.

At the end opposite valve head 27 spindle 28 is connected to temperature-responsive axial-force actuator 34. Over a fixed temperature range the amount of extension is quite accurately determined. A variety of devices of this type are commercially available.

Extending longitudinally along spindle 28 and encompassing it is return spring 35 which is seated against bracket 36 and valve port member 29. It will readily be seen that spring 35 is axially opposed to valve means 23 and biases it toward a valve open position.

Cylinder 24 has a plurality of elongated openings 37 therein to provide fluid communication between inlet port 17, chamber 16, and actuator 34. For the proper functioning of the valve of the invention, it is necessary that there also be a continuous and unimpeded fluid communication between the interior of cylinder 24 and the space between members 29 and 20 to permit a desired flow rate when the valve is fully or near fully open.

This can readily be accomplished in a variety of ways. In the embodiment shown in FIG. 1, actuator 34 is shimmed away from crimped end 26 of cylinder 24 by means of wire retainer 38 inserted in elongated openings 37. Since actuator 34 is rigidly and fixedly connected to spindle 28, this shimming as shown particularly in FIG. 1 causes valve head 27 to extend substantially into the space between members 29 and 20 even when the valve is fully open. This permits the desired flow to occur through valve port 31 and then through valve port 22. Alternatively, instead of shimming, as by retainer 38, the length of spindle 28 may be increased so that even when actuator 34 rests against crimped end 26 of cylinder 24, valve head 27 extends into the space between members 29 and 20 as shown in FIG. 1.

Figure 6:
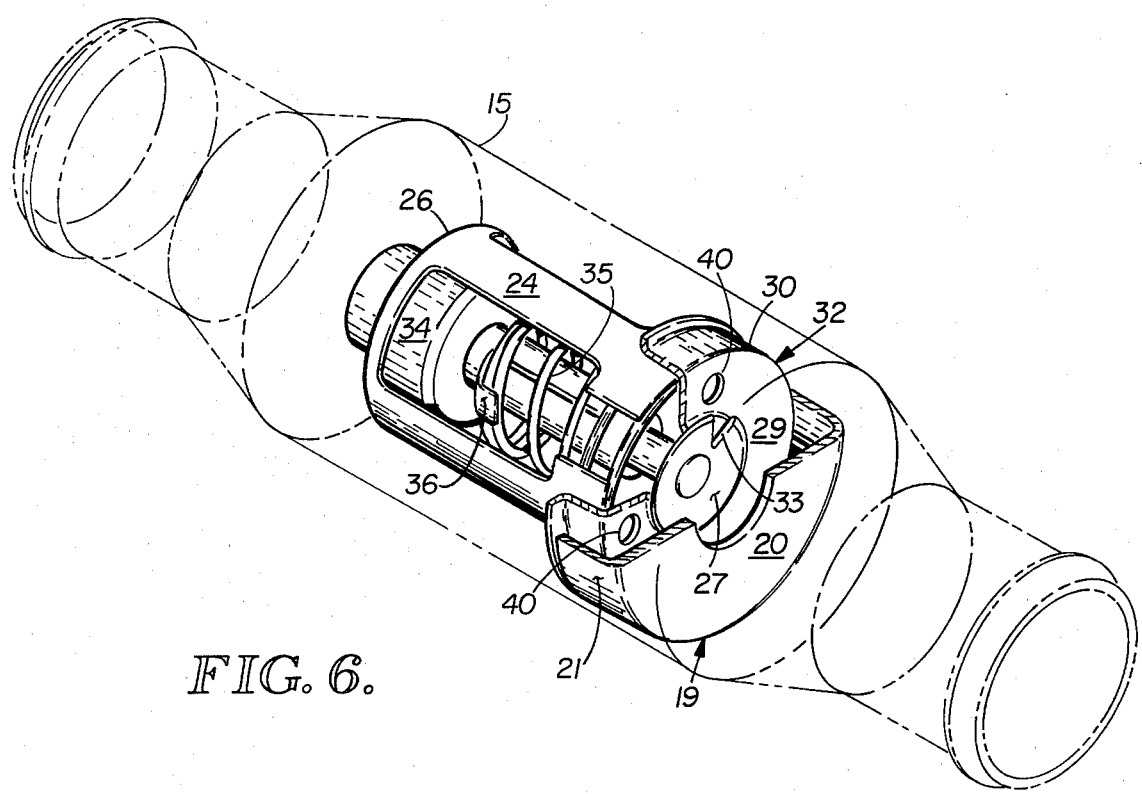
FIG. 6 is an isometric partially cutaway view of another embodiment of the thermostatically controlled valve of the invention showing another way of assuring continuous fluid communication through the second valve port means.

In another embodiment as shown in FIG. 6, the necessary fluid communication between the interior of cylinder 24 and the space between valve port members 29 and 20 is provided by a plurality of openings 40 in member 29. Openings 40 are spaced sufficiently from valve port 31 (see, e.g., FIGS. 2 and 3) that the movement of valve head 27 in the space between valve port members 29 and 20 does not significantly affect the flow of fluid through second valve port means 32.

Figure 4:
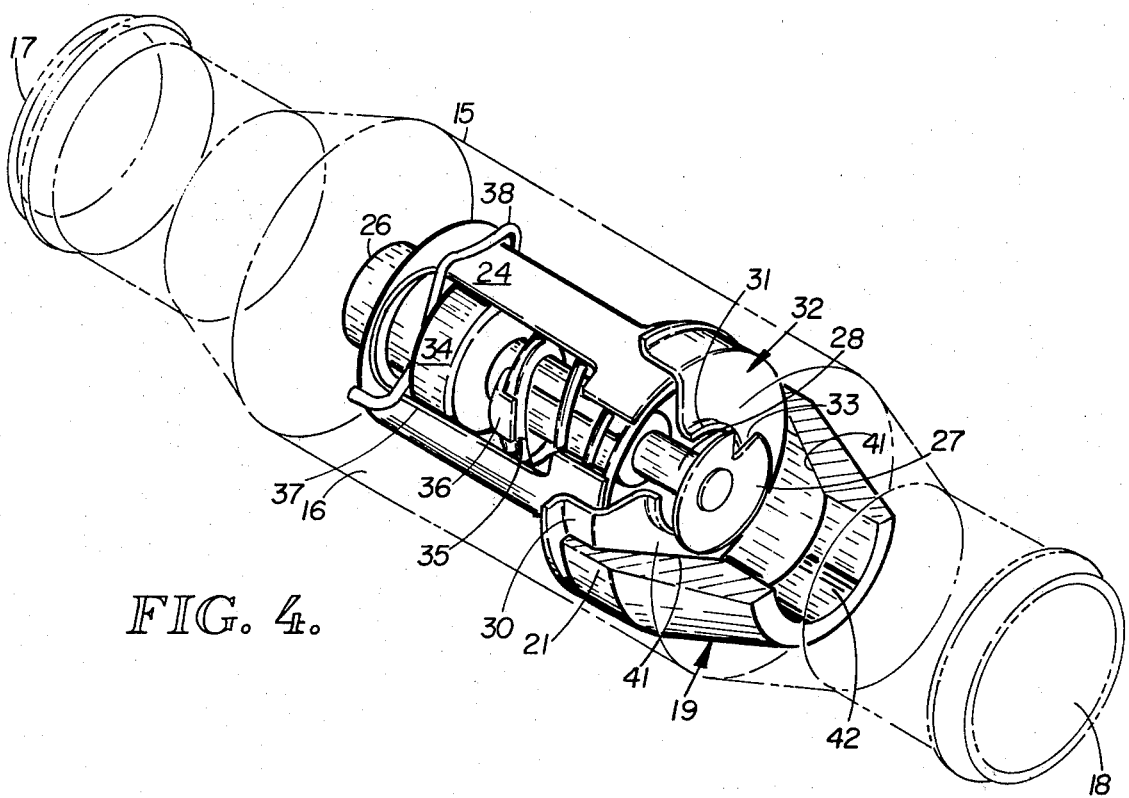
FIG. 4 is an isometric partially cutaway view of a second embodiment of the thermostatically controlled valve of the invention with a different first valve port means than that shown in FIGS. 1-3. The valve is in an open or neutral position.
Figure 5:
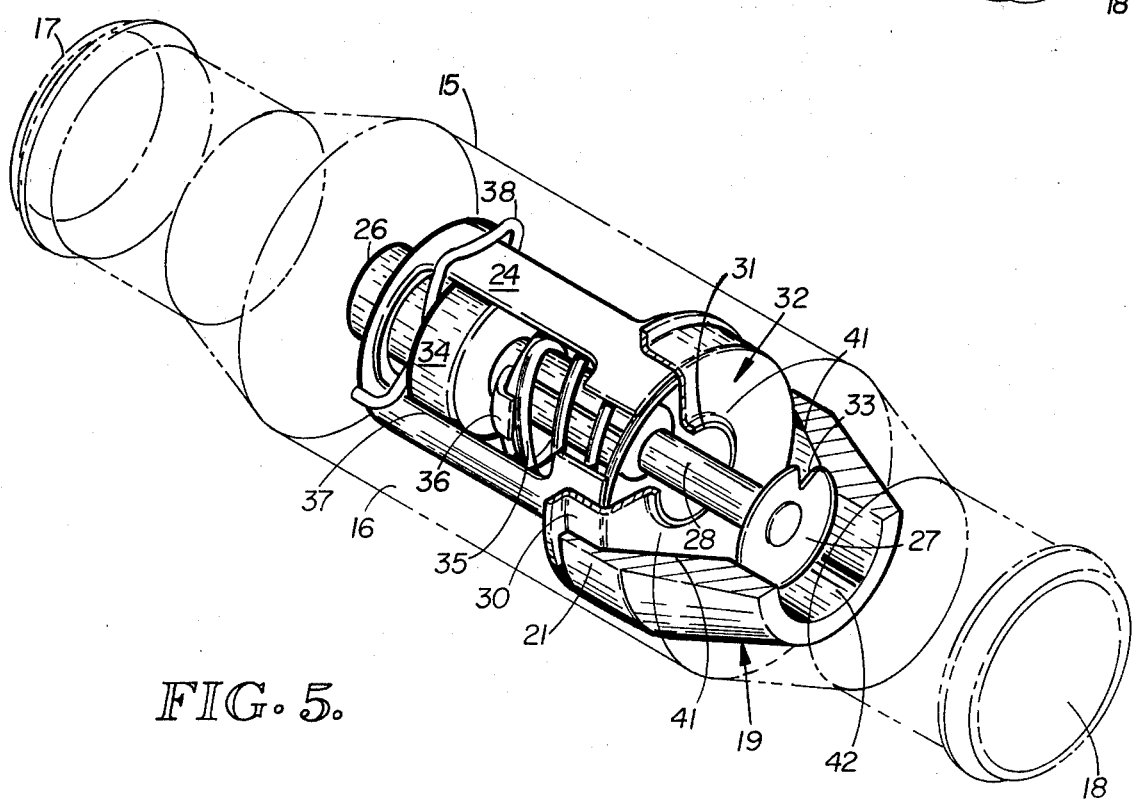
FIG. 5 is an isometric partially cutaway view of the embodiment of FIG. 4 with the valve in a closed position. The valve of FIGS. 4 and 5 has improved self cleaning action.

The embodiment shown in FIGS. 4 and 5 provides another configuration for first valve port means 19. In this configuration, member 20 of FIGS. 2 and 3 is replaced with funnel-shaped element 41 having an elongated port 42. Valve head 27 has a diameter conforming substantially to the internal diameter of port 42 so that the flow of fluid through the valve is regulated by the movement of valve head 27 into and out of port 42.

Regardless of which of the described embodiments is used, the basic operation of the thermostatically controlled valve of the invention remains the same. Thus, the fluid flowing in through inlet port 17 moves past actuator 34 and valve assembly 23 and ultimately through first valve port means 19 and out outlet port 18. As long as the temperature of the fluid is below a certain predetermined value, the action of spring 35 holds the valve assembly in the open position so that a desired flow rate continues. When the temperature raises above this value, however, actuator 34 is activated and causes the valve to start to close, thereby regulating the flow rate through the entire assembly. When a certain temperature is reached or exceeded, the valve is essentially closed with only a small flow continuing through notch 33 in valve head 27. When the fluid temperature decreases, the sequence is reversed with the action of spring 35 causing the valve assembly to open again. It will become apparent that the flow of fluid through the valve of the invention is thus closely regulated in accordance with its temperature.

The use of poppet valve assemblies as shown in the FIGURES is particularly advantageous in that such valves are generally self cleaning. This is particularly true of the embodiment shown in FIGS. 5 and 6. Self cleaning assemblies avoid the build-up of residues which adversely affect performance and may ultimately cause jamming of the valve.

In the embodiments shown in FIGS. 2-6, inlet and outlet ports 17 and 18 have circumferential ridges 45 and 46 adapted to permit the thermostatically controlled valve of the invention to be clamped to hoses or other fluid lines. It will be recognized that any other standard means of connecting the valve to fluid lines or hoses may also be used. As but one example, ports 17 and 18 may be threaded to connect with threaded mating means as appropriate.

Although the thermostatically controlled valve of the invention has been described herein in the general context of its use with a liquid propane vaporizer in an internal combustion engine fuel system, its use is not so limited. Thus it may readily be utilized in any fluid flow system wherein the flow is desired to be regulated in accordance with the temperature of the fluid. In particular, one skilled in the solar heating arts will recognize its utility in solar heating systems.

The foregoing description of preferred embodiments of the invention has been presented for purposes of illustration and description. It is not intended to be exhaustive or to limit the invention to the precise form disclosed, and obviously many modifications and variations are possible. Thus, for example, in an embodiment useful for solar heating applications it may well be desirable to achieve a complete seal with no bleed through the valve. This may readily be accomplished by elimination of notch 33 in the valve head 27 or by adding an elastomeric component to either the valve head or the valve port which assures a complete seal when the valve is closed. The embodiments were chosen and described in order to best explain the principles of the invention and its practical application to thereby enable others skilled in the art to best utilize the invention in various embodiments and with various modifications as are suited to the particular use contemplated. They represent the best mode contemplated by applicant for the practice of the invention at the time this application was executed. It is intended that the scope of the invention be defined by the claims appended hereto.

What is claimed is:

1. A thermostatically controlled valve which comprises:
    (a) an elongated body having an internal chamber and an inlet port and an outlet port opening into said chamber;
    (b) first valve port means symmetrically disposed in said chamber normal to the axis between said inlet and outlet ports;
    (c) valve means disposed in said chamber and axially movable to and from said valve port means so as to adjust flow rate therethrough;
    (d) a spring disposed in said chamber on the inlet side of said first valve port means, said spring axially opposed to said valve means and biasing it toward a valve open position;
    (e) a temperature-responsive axial-force actuator fixedly connected to said valve means in the inlet side of said chamber; and
    (f) means connected to said first valve port means for holding the end of said actuator opposite said first valve port means in fixed spaced relationship to said first valve port means, said connected means placing said inlet port and said actuator in fluid communication with each other, increasing temperature causing expansion of said actuator to move said valve means against said spring, thereby causing said valve means to reduce the flow rate through said first valve port means and hence through said outlet port over at least a portion of the path of said valve means.

2. The thermostatically controlled valve of claim 1 wherein said valve means comprises a poppet valve assembly.

3. The thermostatically controlled valve of claim 2 wherein said means for holding the end of said actuator opposite said first valve port means in fixed spaced relationship to said first valve port means comprises:
    a hollow cylinder axially disposed in said chamber and having the end nearest said inlet port crimped, said actuator being held in said cylinder at said crimped end by the action of said spring;
    second valve port means mounted normal to the opposite end of said cylinder in fixed parallel relationship to said first valve port means, the head of the poppet valve being disposed in the space between said first and second valve port means and axially movable therethrough; and
    means for providing a desired continuous fluid communication between the interior of said cylinder and the space between said first and second valve port means.

4. The thermostatically controlled valve of claims 2 or 3 wherein said first valve port means comprises a funnel shaped member fixedly mounted at the end of said cylinder, the port in said member being axially elongated, and the head of the poppet valve has a diameter conforming substantially to the internal diameter of said elongated port, whereby the flow of fluid through said thermostatically controlled valve is regulated by the movement of said poppet valve head into and out of said elongated port.

5. A thermostatically controlled valve which comprises:
   a body having an internal chamber and an inlet port and an outlet port opening into said chamber, and
   a cartridge disposed axially in said chamber between said inlet port and said outlet port, said cartridge comprising
      a hollow cylinder crimped at the end nearest to said inlet port,
      first valve port means symmetrically disposed normal to the axis of said cylinder at the end of said cylinder adjacent said outlet port,
      valve means partially disposed in said cylinder, said valve means being axially movable relative to said first valve port means so as to adjust the flow of fluid therethrough,
      a return spring axially opposed to said valve means and biasing it toward a valve open position, and
      a temperature-responsive responsive axial force actuator disposed in said cylinder at the end adjacent to said inlet port, said inlet port and said actuator being in fluid communication with each other, increasing temperature causing expansion of said actuator to move said valve means against the action of said return spring, thereby causing said valve means to reduce the flow rate through said first valve port means and hence through said outlet port over at least a portion of the path of said valve means.

6. The thermostatically controlled valve of claim 5 wherein said valve means is a poppet valve fixedly connected to said temperature-responsive axial force actuator.

7. The thermostatically controlled valve of claim 6 having second valve port means mounted normal to the outlet end of said cylinder between the end of said cylinder and said first valve port means and fixedly spaced from said first valve port means, the head of said poppet valve being disposed in the space between said first and second valve port means and axially movable therethrough, and means for providing a desired continuous fluid communication between the interior of said cylinder and the space between said first and second valve port means.

8. The thermostatically controlled valve of claim 7 wherein said means for providing a desired continuous fluid communication between the interior of said cylinder and the space between said first and second valve port means comprises means for precluding the head of said poppet valve from moving closer than a desired distance to the port in said second valve port means.

9. The thermostatically controlled valve of claim 8 wherein said means for precluding the head of said poppet valve from moving closer than a desired distance to the port in said second valve port means comprises means for holding said temperature-responsive axial force actuator in spaced relationship to the inlet end of said cylinder.

10. The thermostatically controlled valve of claim 9 wherein said cylinder has a plurality of elongated openings in its wall for providing fluid communication between said inlet port and said actuator, and said means for holding said actuator in spaced relationship to the inlet end of said cylinder is a retainer inserted through said elongated openings in said cylinder wall.

11. The thermostatically controlled valve of claim 7 wherein said means for providing a desired continuous fluid communication between the interior of said cylinder and the space between said first and second valve port means comprises a plurality of openings in said second valve port means spaced sufficiently from the valve port in said second valve port means that the movement of said poppet valve head in the space between said first and second valve port means does not significantly affect the flow of fluid through said second valve port means.

12. The thermostatically controlled valve of claims 6, 7, 8, 9. 10, or 11 wherein said first valve port means comprises a funnel-shaped member fixedly mounted at the outlet end of said cylinder, the port in said member being axially elongated and the head of said poppet valve has a diameter conforming substantially to the internal diameter of said elongated port, whereby the flow of fluid through said thermostatically controlled valve is regulated by the movement of said poppet valve head into and out of said elongated port.

* * * * *